United States Patent [19]

Smith

[11] Patent Number: 5,383,039
[45] Date of Patent: Jan. 17, 1995

[54] FOCUSED ILLUMINATION, REDUCED LIGHT LEAKAGE FLOODLIT CENTER HIGH MOUNTED STOPLIGHT

[75] Inventor: Ronald T. Smith, Torrance, Calif.

[73] Assignee: Hughes Aircraft Company, Los Angeles, Calif.

[21] Appl. No.: 995,238

[22] Filed: Dec. 22, 1992

[51] Int. Cl.⁶ .............................................. G03H 1/00
[52] U.S. Cl. ..................... 359/13; 340/479; 359/15; 359/710; 362/80.1; 362/328
[58] Field of Search .......... 359/13, 14, 15, 19, 359/22, 710, 718, 720, 34; 362/80.1, 268, 32, 83.3, 327, 328; 340/468, 479; 40/547

[56] References Cited

U.S. PATENT DOCUMENTS

| | | | |
|---|---|---|---|
| 3,079,491 | 2/1963 | Janssen | 359/710 |
| 4,456,948 | 6/1984 | Brun | 362/268 |
| 4,916,593 | 4/1990 | Moss et al. | 340/479 |
| 4,935,722 | 6/1990 | Pollack | 340/479 |
| 5,101,193 | 3/1992 | Smith et al. | 340/479 |

FOREIGN PATENT DOCUMENTS

| | | | |
|---|---|---|---|
| 0154403 | 9/1984 | Japan | 359/710 |
| 2042757 | 9/1980 | United Kingdom | 359/720 |
| 227555A | 7/1990 | United Kingdom | 340/468 |

*Primary Examiner*—Loha Ben
*Assistant Examiner*—Michael A. Papalas
*Attorney, Agent, or Firm*—L. A. Alkov; W. K. Denson-Low

[57] ABSTRACT

A holographic center high mounted stoplight (CHMSL) system for a vehicle having a rear window. The CHMSL system includes a stoplight hologram secured adjacent the rear window, a playback illumination source for providing along a source optical axis a vertically converging beam that converges to a horizontal line focus, and a thick concave/convex lens responsive to the vertically converging beam for (1) controlling the vertically converging beam to converge to a line focus that is within said lens and further from the illumination source than such line focus would be without the lens and (2) providing an output beam along an output axis that is tilted upwardly relative to the source optical axis. More particularly, the thick concave/convex lens includes a concave cylindrical entrance surface having a first horizontal cylinder axis that intersects the source optical axis, and a convex cylindrical exit surface having a second horizontal cylinder axis that is parallel to the first horizontal cylinder axis and is above the source axis such that the output axis is tilted upwardly relative to said source axis.

4 Claims, 2 Drawing Sheets

FOCUSED ILLUMINATION, REDUCED LIGHT LEAKAGE FLOODLIT CENTER HIGH MOUNTED STOPLIGHT

BACKGROUND OF THE INVENTION

The disclosed invention is directed generally to holographic center high mounted stoplight systems for vehicles, and more particularly to a holographic center high mounted stoplight system having focused playback illumination having reduced light leakage.

Present federal regulations require center high mounted stoplights (CHMSLs) in addition to the standard stoplights mounted in the rear portion of an automobile. The CHMSLs are intended to maximize the visibility of the automobile braking indicators to drivers following the braking vehicle, and are commonly mounted on the rear window of an automobile.

CHMSLs have commonly been implemented as a standard lenticular lens and an illuminating incandescent bulb enclosed in a housing that is typically secured adjacent the top or bottom of an automobile rear window. However, the bulky housing partially obscures the rearward vision of the driver, and moreover imposes limitations on the design of the automobile.

CHMSLs have been also integrated into automobile body parts such as rear decks, spoilers, roofs, which to some degree substantially reduce or remove the rearward vision problem. However, such stoplights are complex and may impose limitations on the design of the automobile.

Holographic CHMSL systems have also been developed in order to efficiently meet the stoplight regulations. A holographic CHMSL system typically includes a stoplight hologram secured to the inside surface of the rear window of a vehicle, a playback light source activated by the braking system of the vehicle, and possibly a red filter located in the light path between the playback light source and the hologram. In order to minimize the power of the playback light source while producing diffracted stoplight illumination of the required luminous intensity, the light is preferably placed as close as practicable to the hologram, but out of driver's rearview mirror field of view. For example, the playback light source can be near the rear header that comprises the roof support structure in the roof of a vehicle which laterally traverses the vehicle.

A consideration with a roof lit CHMSL, however, is that the light source can be close to the hologram and out of the driver's rearview mirror field of view only for rear windows that are not too steep (i.e., not too close to horizontal). If the vehicle rear window is too steep, it becomes more difficult to achieve a sufficiently bright hologram while maintaining the playback source out of the driver's rearview mirror field of view. Lowering the playback illumination source to accommodate the steeper angle of the hologram would place the light source in the driver's rearview mirror field of view, and may impinge on the head motion arc of the rear center occupant, which is traced by a point on the top of the 95th percentile rear center occupant's head as he bends forward and backward in the vehicle. Impingement of the rear center occupant head motion arc introduces the potential problem of partial blockage of the playback light by the head of the rear center occupant, as well as the potential problem of head contact with the light source, which can become very hot.

Positioning the light source further forward of the hologram would alleviate the head bumping problem and possibly remove the light source from the driver's rearview mirror field of view, but the problem of head blockage would still remain. Moreover, the power of the light source would have to be increased to compensate for the increased distance to the hologram as well as to compensate for the increased stray light that is outside of the region subtended by the hologram.

One technique that attempts to address the problem of steep rear windows involves the use of multiple light guides for guiding the playback illumination to the hologram, which allows for convenient location of the light source. A consideration with light guides, however, is the cost of the light guides.

SUMMARY OF THE INVENTION

It would therefore be an advantage to provide a holographic center high mounted stoplight system for a vehicle that avoids the problem of head bumping and light blockage when implemented in vehicles having steep rear windows.

Another advantage would be to provide a holographic center high mounted stoplight system for a vehicle that reduces the amount of stray playback light that is outside the region subtended by the stoplight hologram of the system.

The foregoing and other advantages are provided by the invention in a holographic center high mounted stoplight system that includes a stoplight hologram secured adjacent the rear window of a vehicle, a playback illumination source for providing along a source optical axis a vertically converging beam that converges to a horizontal line focus, and a thick concave/convex lens responsive to the vertically converging beam for (1) controlling the vertically converging beam to converge to a line focus that is within said lens and further from the illumination source than such line focus would be without the lens and (2) providing an output beam along an output axis that is tilted upwardly relative to the source optical axis. More particularly, the thick concave/convex lens includes a concave cylindrical entrance surface having a first horizontal cylinder axis that intersects the source optical axis, and a convex cylindrical exit surface having a second horizontal cylinder axis that is parallel to the first horizontal cylinder axis and is above the source axis such that the output axis is tilted upwardly relative to said source axis.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
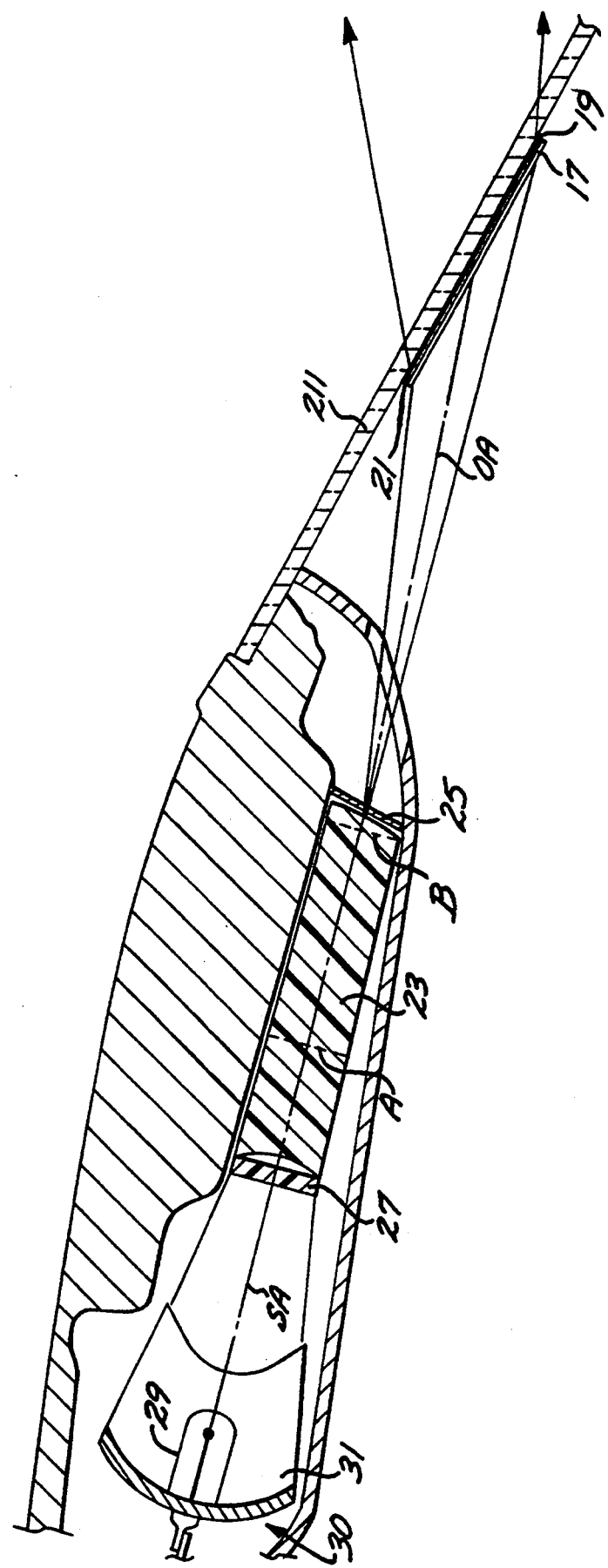
FIG. 1 is a schematic side elevational view of a holographic center high mounted stoplight system in accordance with the invention.

In the following detailed description and in the several figures of the drawing, like elements are identified with like reference numerals.

Referring now to FIG. 1, shown therein is a center high mounted stoplight system which includes a transmission CHMSL hologram 21 that is secured to the inside surface of an automobile rear window 211 by a transparent layer of optical adhesive 19, for example, and is covered by a transparent substrate 17. The CHMSL hologram 21 is substantially transparent to the rearward vision of the driver, and is configured to diffract, when illuminated by appropriate playback illumination, stoplight illumination that is visible from behind the automobile over the appropriate vertical and horizontal viewing angles. By way of specific example, the hologram can provide the image of a lenticular stoplight which can include a logo if desired.

The playback illumination for the CHMSL hologram 21 is provided by the light output from a thick concave/convex lens 23. The playback illumination output of the thick concave/convex lens 23 can be linearly P-polarized by a linear polarizer 25 so as to reduce reflection off the hologram assembly and the rear window 211. The input illumination for the thick concave/convex lens 23 comprises a diverging beam that is produced by a light source 30 and filtered by a high pass filter 27 having a cutoff wavelength of about 600 nanometers (nm). As a result of the spectral characteristics of human vision, the image provided by the CHMSL hologram will be perceived as red, with the apparent peak intensity being somewhere between about 600 and 620 nm. In other words, the high pass filter 27 comprises a red filter.

The light source 30 more particularly includes an incandescent lamp 29, such as a halogen bulb, and a paraelliptical reflector 31. Light from bulb 29 is captured and reflected by paraellipical reflector 30 to produce a light beam that propagates along a source optical axis SA and converges only in the vertical direction, and which would otherwise approximately converge to a line focus at position A without thick concave/convex lens 23, wherein the line focus would be orthogonal to the plane shown in FIG. 1. In addition, a small amount of light from bulb 29 propagages directly to thick concave/convex lens 23 without reflecting off of paraelliptical reflector 31 and does not converge to a vertical line focus; however, the quantity of this light is considered negligble, and, therefore, is ignored. The incandescent lamp 29 is connected to the brake light actuating circuit of the automobile so as to be energized when the brake pedal is depressed.

Figure 2:
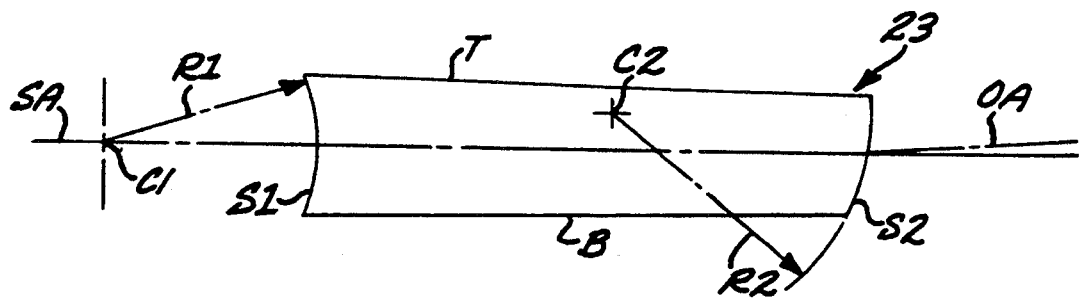
FIG. 2 is a schematic side elevational view of the thick concave/convex lens of the holographic center high mounted stoplight system of FIG. 1.
Figure 3:
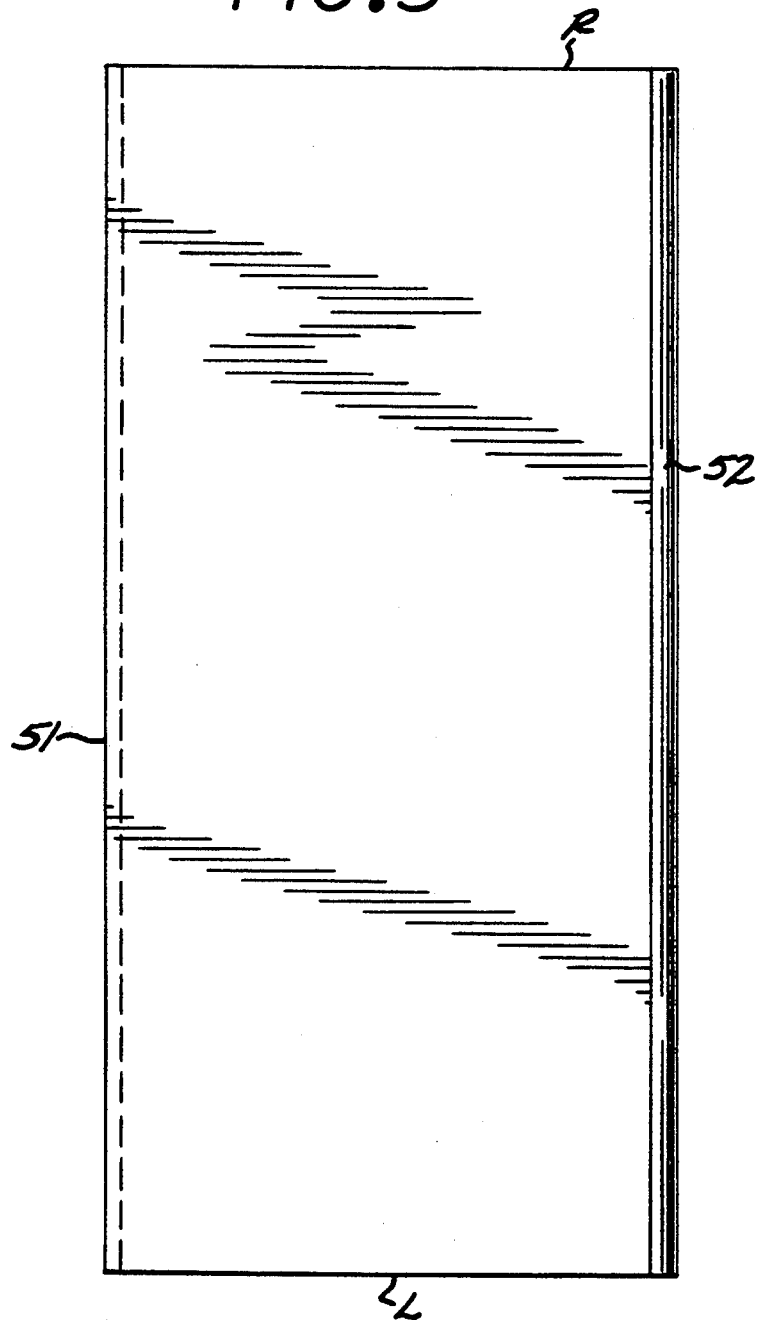
FIG. 3 is a schematic top plan view of the thick concave/convex lens of the holographic center high mounted stoplight system of FIG. 2.

Referring more particularly to FIGS. 2 and 3, the thick concave/convex lens 23 is at least as wide horizontally as the horizontal width of the CHMSL hologram 21, and includes a concave cylindrical entrance surface S1 having a cylinder radius R1 and a cylinder axis C1 that is horizontal and passes through the optical axis SA of the light source 30. The concave/convex lens 23 further includes a convex cylindrical exit surface S2 having a cylinder radius of R2 and a cylinder axis C2 that is horizontal and parallel to the cylinder axis C1 of the entrance surface S1, and is located above the optical axis of the light source 30.

The top and bottom surfaces T, B of the thick concave/convex lens 23 are planar and can converge slightly toward each other with distance from the light source 30. The sides L, R of the thick concave/convex lens 23 are vertical and parallel to each other.

The concave cylindrical entrance surface S1 functions to move the actual line focus of the light source beam to a location B which is further from light source 30 than the location A at which the line focus would be without the thick concave/convex lens. The convex cylindrical exit surface S1 functions as a field lens to direct the playback beam exiting the surface along an output axis OA that is tilted upwardly from the optical axis SA of the light source 30, as a result of positioning the cylinder axis C2 of the exit surface S2 above the optical axis SA of the light source 30.

As a result of the thick concave/convex lens 23, the linear polarizer, the thick concave/convex lens 23, the red filter 27, and the light source 30 can be located in the roof header of the vehicle out of the driver's rear view mirror field of view, while allowing more light to be directed to the CHMSL hologram. This is due to the following factors. The tilt of the convex cylindrical surface S2 allows the light source optical axis SA to be at a greater angle relative to horizontal than the output axis OA of the playback beam that exits the convex cylindrical surface S2. The thick concave/convex lens moves the line focus of the light from the position A to the position B, and thereby effectively elongates the throw distance between the light source and the hologram without widening the beam that is incident on the hologram, and the focusing achieved by the paraelliptical reflector and the field lens at the surface S2 further functions to confine the beam. Simply stated, the thick concave/convex lens 23 allows the light source to be located further from the hologram (where the increase in distance is the distance between positions A and B), controls the spread of the playback light such that more light is delivered to the hologram than would be possible without the thick concave/convex lens, and further allows the light source to have an optical axis that is different from the axis of the playback beam that is incident on the hologram since the direction of the output of the thick concave/convex lens can be controlled.

The foregoing has been a disclosure of a holographic center high mounted stoplight that is compatible with steep rear windows, reduces the amount of stray light that is not delivered to the CHMSL hologram, and allows for increased distance of the playback light source without requiring increased power of the light source.

Although the foregoing has been a description and illustration of specific embodiments of the invention, various modifications and changes thereto can be made by persons skilled in the art without departing from the scope and spirit of the invention as defined by the following claims.

What is claimed is:

1. A holographic stoplight system for a vehicle having a rear window, comprising:
   a stoplight hologram secured adjacent the rear window;
   a playback illumination source for providing light to said stoplight hologram along a source optical axis by way of a vertically converging beam that converges to a horizontal line focus; and
   a lens for controlling said vertically converging beam to converge to a line focus that is within said lens and further from the illumination source than such line focus would be without said lens, and for providing an output beam along an output axis.

2. The holographic stoplight system of claim 1 wherein said output axis is tilted upwardly relative to the source optical axis.

3. The holographic stoplight system of claim 1 wherein said lens includes a concave cylindrical entrance surface having a first horizontal cylinder axis and a convex cylindrical exit surface having a second horizontal cylinder axis that is parallel to said first horizontal cylinder axis.

4. The holographic stoplight system of claim 3 wherein said first horizontal cylinder axis intersects said source axis, and wherein said second horizontal cylinder axis is above said source axis such that said output axis is tilted upwardly relative to said source axis.

* * * * *